(12) United States Patent
Nakano et al.

(10) Patent No.: US 6,826,470 B2
(45) Date of Patent: Nov. 30, 2004

(54) FUEL INJECTION CONTROL DEVICE

(75) Inventors: Futoshi Nakano, Fujisawa (JP);
Koichiro Yomogida, Fujisawa (JP);
Yuji Sasaki, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 0 days.

(21) Appl. No.: 10/741,286

(22) Filed: Dec. 18, 2003

(65) Prior Publication Data

US 2004/0133334 A1 Jul. 8, 2004

(30) Foreign Application Priority Data

Dec. 25, 2002 (JP) ........................................ 2002-374327

(51) Int. Cl.$^7$ ................................................ G06F 7/00
(52) U.S. Cl. ...................... 701/103; 123/299; 123/480
(58) Field of Search ................................. 701/103, 104, 701/102, 115; 123/478, 480, 486, 299, 300

(56) References Cited

U.S. PATENT DOCUMENTS 6,491,016 B1 * 12/2002 Buratti ........................ 123/299
2003/0221680 A1 * 12/2003 Tonetti et al. ............... 123/674

FOREIGN PATENT DOCUMENTS

| JP | 11-173200 | 6/1999 |
| JP | 2000-205021 | 7/2000 |
| JP | 2001-050097 | 2/2001 |

* cited by examiner

Primary Examiner—Hieu T. Vo
(74) Attorney, Agent, or Firm—McCormick, Paulding & Huber LLP

(57) ABSTRACT

A fuel injection control device for executing multiple injection includes first means for determining the total injection quantity of fuel (Qtotal), second means for determining base injection quantities (QBsub) of each auxiliary injection, and third means which, when the sum (QBsubtotal) of base injection quantities (Qsub) of each of auxiliary injections is not larger than the value obtained by multiplying the total injection quantity (Qtotal) by a coefficient (K) (0<K$\leq$1), computes the injection quantity (QTmain) of the main injection by subtracting the sum (QBsubtotal) from the total injection quantity (Qtotal), and when the sum (QBsubtotal) is larger than the value obtained by multiplying the total injection quantity (Qtotal) by the coefficient (K), computes the injection quantity (QTmain) of the main injection by reduction correcting the base injection quantities (QBsub) of auxiliary injections so that the sum (QBsubtotal') of injection quantities (QBsub') of auxiliary injections after the correction becomes not larger than the value obtained by multiplying the total injection quantity (Qtotal) by the coefficient (K), and by subtracting the sum (QBsubtotal') after the correction from the total injection quantity (Qtotal).

4 Claims, 3 Drawing Sheets

FUEL INJECTION CONTROL DEVICE

CROSS REFERENCE TO RELATED APPLICATION

Applicants hereby claims foreign priority benefits under U.S.C. § 119 of Japanese Patent Application No. 2002-374327, filed on Dec. 25, 2002, and the content of which is herein incorporated by reference.

BACKGROUND OF THE INVENTION

1. Field of the Invention

The present invention relates to a fuel injection control device of a diesel engine, and more particularly to a fuel injection control device for executing multiple injection by conducting a plurality of auxiliary injections and a main injection within one cycle.

2. Description of the Related Art

Diesel engines equipped with a fuel injection control device for executing multiple injection (multiinjection) by conducting a plurality of auxiliary injections and a main injection within one cycle have recently been suggested (for example, Japanese Patent Applications Laid-open Nos. 2000-205021 and 2001-50097).

The applicant has invented a fuel injection control device for executing multiple injection, such as shown in FIG. 2. FIG. 2 shows a drive pulse (current pulse) outputted to a drive circuit of injectors for executing fuel injection with the injectors; in the figure, a crank angle is plotted against the abscissa.

In multiple injection, a total of four injections (three types of auxiliary injections and a main injection) are executed within one cycle. First, a pilot injection PI is carried out at the instant of time prior to the main injection M. This is done for premixing the fuel. Then, a pre-injection PR is carried out immediately prior to the main injection M. This is done to produce flame and prevent an ignition delay. Then, the main injection M is carried out in the vicinity of compression top dead center TDC, and an after-injection AF is carried out after the main injection M. This is done to burn the non-combusted fuel.

A post injection is sometimes carried out after the after-injection AF. This is, however, done to improve the treatment capability of an exhaust gas after-treatment device and makes no contribution to the combustion in the engine. Accordingly, this injection will not be considered herein.

The injection quantity of each auxiliary injection is determined based on the parameters representing the engine operation state such as engine revolution speed and engine load. For example, the optimum injection quantity of each auxiliary injection is determined by tests conducted in advance for each operation state, and a respective map is created for each auxiliary injection. Then, the injection quantity for each auxiliary injection is determined from the maps based on the parameters such as engine revolution speed and engine load that were actually detected.

The injection quantity of the main injection is determined as follows.

First, a total injection quantity Qtotal of the fuel injected within one cycle is determined from the map based on the parameters representing the engine operation state such as engine revolution speed and engine load. Further, the injection quantities Qsub of each auxiliary injection are then determined from the above-mentioned maps for auxiliary injections. The injection quantity Qmain of the main injection is then computed by subtracting the sum Qsubtotal of injection quantities Qsub of auxiliary injections from the total injection quantity Qtotal (Qmain=Qtotal−Qsubtotal).

However, in the above-described fuel injection control device there were cases in which the injection quantity Qmain of the main injection decreased below the necessary minimum limit due to engine operation state. In other words, at least a certain fraction (this fraction differs depending on the engine operation state) of the total injection quantity Qtotal had to be secured as the injection quantity Qmain of the main injection, but there were cases in which the fraction taken by the injection quantity Qmain of the main injection in the total injection quantity Qtotal decreased below the lower limit value as a result of subtracting the sum Qsubtotal of injection quantities Qsub of auxiliary injections from the total injection quantity Qtotal.

Furthermore, it was understood that certain engine operation states result in a contradiction in that the sum Qsubtotal of injection quantities Qsub of auxiliary injections becomes larger than the total injection quantity Qtotal of fuel.

For example, such a problem can be encountered when the total injection quantity Qtotal becomes very small, for example in an engine idle mode. One of the reasons is that injection quantity Qsub of each auxiliary injection assumes a minimum value in the region in which the total injection quantity Qtotal is very small. However, because the injection quantity control capabilities of injectors are limited, the injection quantity Qsub of auxiliary injections has to be set at a minimum injection quantity of injectors or higher on the map. For example, if the minimum injection quantity of an injector is 2 mm$^3$/st, setting has to be made to 2 mm$^3$/st even though the optimum injection quantity of auxiliary injection is, for example, 1.6 mm$^3$/st. As a result, the above-described problem sometimes occurs in a region in which the total injection quantity Qtotal is very small.

Furthermore, the injection quantity Qsub of each auxiliary injection is determined from the map and then corrected based on the water temperature and intake temperature, but the above-described problem sometimes occur when the injection quantity Qsub of each auxiliary injection is incrementally corrected.

SUMMARY OF THE INVENTION

It is an advantage of the present invention to provide a fuel injection control device for determining the injection quantity of the main injection by subtracting the sum of injection quantities of auxiliary injections from the total injection quantity of fuel, wherein the fraction assumed by the injection quantity of the main injection in the total injection quantity can be secured at least to a minimum limit value necessary for the engine operation state.

In order to attain the above-mentioned object, the present invention provides a fuel injection control device for executing multiple injection by conducting a plurality of auxiliary injections and a main injection within one cycle, comprising first means for determining the total injection quantity Qtotal of fuel injected within one cycle based on the parameters representing the engine operation state; second means for determining base injection quantities QBsub of each of the auxiliary injections based on the parameters representing the engine operation state; and third means which, when the sum QBsubtotal of base injection quantities QBsub of each of the auxiliary injections is not larger than the value obtained by multiplying the total injection quantity Qtotal by a coefficient K ($0<K\leq 1$), computes the injection quantity QTmain of the main injection by subtracting the sum QBsubtotal from the total injection quantity Qtotal, and when the sum QBsubtotal is larger than the value obtained by multiplying the total injection quantity Qtotal by the coefficient K, computes the injection quantity QTmain of the main injection by reduction correcting the base injection quantities QBsub of the auxiliary injections so that the sum QBsubtotal' of injection quantities QBsub' of auxiliary injections after the correction becomes not larger than the value obtained by multiplying the total injection quantity Qtotal by the coefficient K, and subtracting the sum QBsubtotal' after the correction from the total injection quantity Qtotal. With the fuel injection control device in accordance with the present invention, the injection quantity of the main injection can be secured at least to a minimum limit value necessary for the engine operation state. Furthermore, the occurrence of the aforesaid contradiction relating to computation is prevented.

Here, the third means may compute a correction coefficient C by dividing the value obtained by multiplying the total injection quantity Qtotal by the coefficient K by the sum QBsubtotal when the sum QBsubtotal of base injection quantities QBsub of each of the auxiliary injections is larger than the value obtained by multiplying the total injection quantity Qtotal by the coefficient K, multiply each of the base injection quantities QBsub of auxiliary injections by the correction coefficient C, and reductionally correct the base injection quantities QBsub of each auxiliary injection at equal ratio.

Further, the third means may determine the coefficient K based on parameters representing the engine operation state such as engine revolution speed and engine load.

DESCRIPTION OF THE PREFERRED EMBODIMENTS

A preferred embodiment of the present invention will be described hereinbelow based on the appended drawings.

Figure 1:
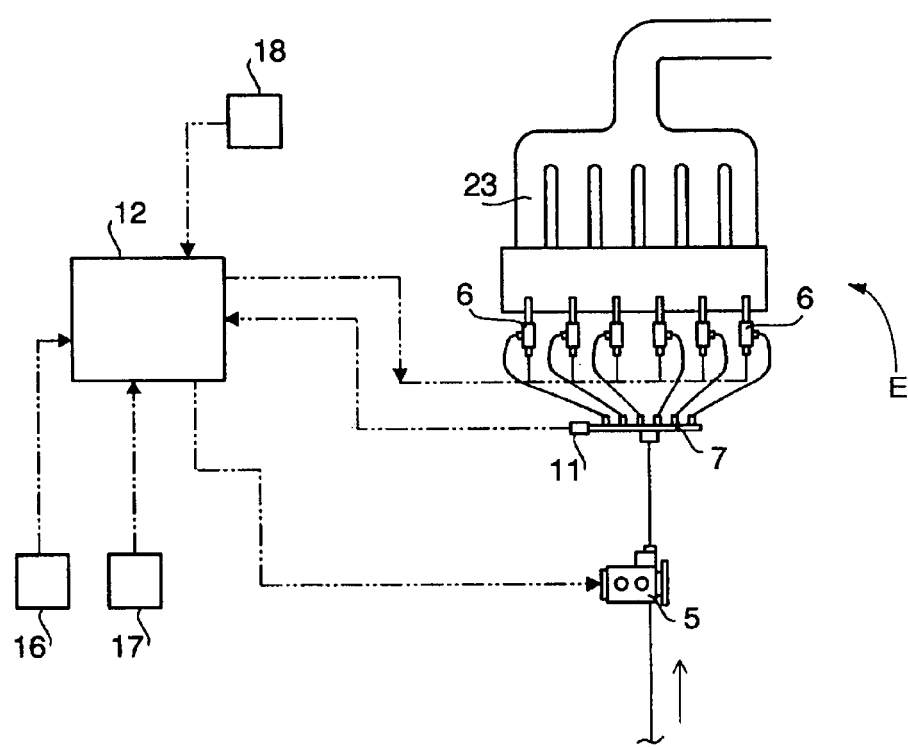
FIG. 1 is a schematic view of the fuel injection control device in accordance with the present invention.

FIG. 1 is a schematic view of the fuel injection control device of the present embodiment.

The fuel injection control device of the present embodiment is designed to execute the fuel injection control in a six-cylinder diesel engine E installed on a vehicle.

A fuel injector (fuel injection valve) 6 is provided in each cylinder of an engine E. A high-pressure fuel at a common rail pressure (for example, from several tens to several hundreds of MPa), which is stored in a common rail 7, is constantly supplied to each injector 6. Fuel supply into the common rail 7 is carried out by a supply pump 5. Thus, fuel present in a fuel-tank (not shown in the figure) is supplied to the supply pump 5, then pressure is applied to the fuel by the supply pump 5, and the fuel is pumped to the common rail 7. The supply pump 5 is a pressure-adjustable pump in which the discharge pressure can be adjusted. The discharge pressure of the pump is controlled by a controller 12.

A pressure sensor 11 is provided in the common rail 7, and the fuel pressure inside the common rail 7 is detected with the pressure sensor 11 and the detected value is inputted into the controller 12.

The controller 12 conducts the overall control of the device and comprises a CPU for control processing and computation processing and a memory (ROM) for storing control programs, maps, and the like. Detection means such as an engine revolution sensor 16 for detecting the revolution speed of the engine E, an accelerator opening degree sensor 17 for detecting the accelerator opening degree in the vehicle, and a crank angle sensor 18 for detecting the angle of a crankshaft (not shown in the figure) of the engine E, are connected to the controller 12. The detected values of each detection means 16, 17, and 18 are inputted into the controller 12. Further, the engine revolution sensor 16 and the crank angle sensor 18 may be substantially identical.

The controller 12 controls the opening/closing of injectors 6 by outputting a drive pulse (current pulse) to a drive circuit (not shown in the figures) of injectors 6 according to the crank angle signal transmitted from the crank angle sensor 18 and controls the injection period and injection quantity of the fuel injected by the injectors 6.

Figure 2:
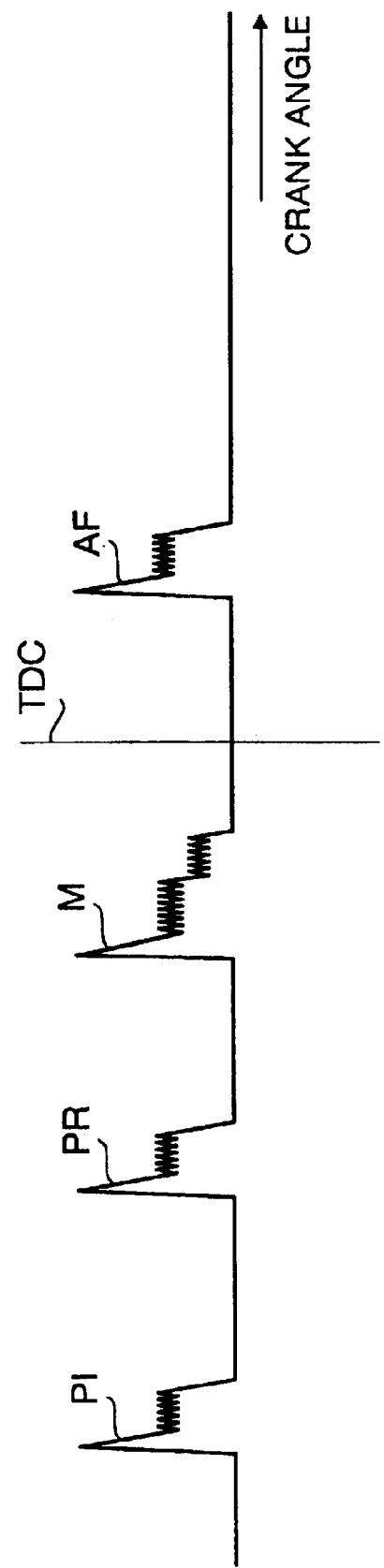
FIG. 2 is an explanatory view illustrating the multiple injection executed by the fuel injection control device of one embodiment of the present invention.

A fuel injection control device of the present embodiment implements a multiple injection shown in FIG. 2. The object of each auxiliary injection was described in the Related Technology section of the specification and the explanation thereof is therefore herein omitted. Essentially, the main injection M and three types of auxiliary injections (pilot injection PI, pre-injection PR, and after-injection AF) are executed.

A method for determining the injection quantity for each injection will be described below.

A controller 12 shown in FIG. 1 stores a map which determines the total injection quantity Qtotal of fuel injected within one cycle for each engine operation state and a map which determines the base injection quantity QBsub of each auxiliary injection (a general term for a base injection quantity QBpi of pilot injection, a base injection quantity QBpr of pre-injection, and a base injection quantity QBaf of after-injection) for each engine operation state. Thus, the controller 12 stores at least four maps.

Based on those maps, the controller 12 determines the total injection quantity Qtotal of the fuel and the base injection quantity QBsub of each auxiliary injection, and basically determines the target injection quantity QTmain of the main injection by subtracting the sum QBsubtotal of base injection quantities QBsub of each auxiliary injection from the total injection quantity Qtotal of the fuel.

However, when the sum QBsubtotal of base injection quantities QBsub of each auxiliary injection is larger than the value obtained by multiplying the total injection quantity Qtotal by a coefficient K, the injection quantity QBsub of each auxiliary injection is corrected with the reduction and the sum QBsubtotal' of base injection quantities QBsub' of auxiliary injections after the correction becomes equal to the value obtained by multiplying the total injection quantity Qtotal by a coefficient K or less than that. The target injection quantity QTmain of the main injection is then determined by deducting the sum QBsubtotal' of base injection quantities QBsub' of auxiliary injections after the correction from the total injection quantity Qtotal.

The coefficient K defines the upper limit of the fraction taken by the sum QBsubtotal of base injection quantities QBsub of auxiliary injections in the total injection quantity Qtotal of fuel injected within one cycle and assumes a value satisfying the formula: $0 < K \leq 1$. The smaller is the coefficient K, the smaller is the fraction that can be taken by the aforesaid sum QBsubtotal. Conversely, the larger is the coefficient K, the larger is the fraction that can be taken by the aforesaid sum QBsubtotal. For example, if the coefficient K is 0.6, the injection quantity of auxiliary injections (the aforesaid total QBsubtotal) can take up to 60% of the total injection quantity Qtotal. If the coefficient K is 1, the entire total injection quantity Qtotal can be taken by the injection quantity of auxiliary injections.

It can be also said that the coefficient K defines the lower limit of the fraction taken by the injection quantity Qmain of the main injection in the total injection quantity Qtotal. In other words, because the value obtained by subtracting the sum QBsubtotal of the base injection quantities QBsub of auxiliary injections from the total injection quantity Qtotal becomes the injection quantity Qmain of the main injection, the fraction that cannot be taken by the auxiliary injections is reliably secured by as the injection quantity Qmain of the main injection. For example, if the coefficient K is 0.6, at least 40% of the total injection quantity Qtotal is necessarily secured as the injection quantity Qmain of the main injection. Furthermore, when the coefficient K is 1, the injection quantity Qmain of the main injection sometimes can become 0.

In the present embodiment, the coefficient K varies according to the engine operation state. Thus, the minimum necessary values of the fraction taken by the injection quantity Qmain of the main injection in the total injection quantity Qtotal are found for each engine operation state, for example, by preliminary tests and those values are mapped as the values of coefficient K. The controller 12 determines a coefficient K from the map based on the parameters representing the engine operation state, such as the actual engine revolution speed detected by an engine revolution sensor 16 and an actual accelerator opening degree (engine load) detected by an accelerator opening degree sensor 17. The coefficient K is not necessarily determined from the map; it may be also found by computation from the parameters representing the engine operation state.

As described hereinabove, in the present device, the sum QBsubtotal of injection quantities QBsub of auxiliary injections is limited (reductionally corrected) so as to become not more than the value obtained by multiplying the total injection quantity Qtotal by a coefficient K. Therefore, the fraction taken by the injection quantity Qmain of the main injection in the total injection quantity Qtotal necessarily becomes larger than the minimum value required for the specific engine operation state.

Even when the aforesaid sum QBsubtotal becomes larger than the total injection quantity Qtotal, because the base injection quantities QBsub of auxiliary injections are reductionally corrected, the contradictory condition of the value of the injection quantity Qmain of the main injection becoming negative does not occur.

A method for determining the injection quantity of each auxiliary injection and the main injection with the controller 12 of the present embodiment will be described hereinbelow with reference to FIG. 3.

The controller 12 determines the total injection quantity Qtotal of fuel injected within one cycle from the map (not shown in the figure) based on the actual engine revolution speed detected by the engine revolution sensor 16, and an actual accelerator opening degree (engine load) detected by the accelerator opening degree sensor 17.

The controller 12 also determines the base injection quantities QBsub (QBpi, QBpr, QBaf) of each auxiliary injection from the auxiliary injection quantity determination maps M1–M3, based on the total injection quantity Qtotal determined form the map and the actual engine revolution speed Eng rpm detected by the engine revolution sensor 16. Further, because the total injection quantity Qtotal is determined from the engine revolution speed and accelerator opening degree (engine load), it can be also said that the base injection quantity QBsub of each auxiliary injection is determined from the engine revolution speed and engine load.

Figure 3:
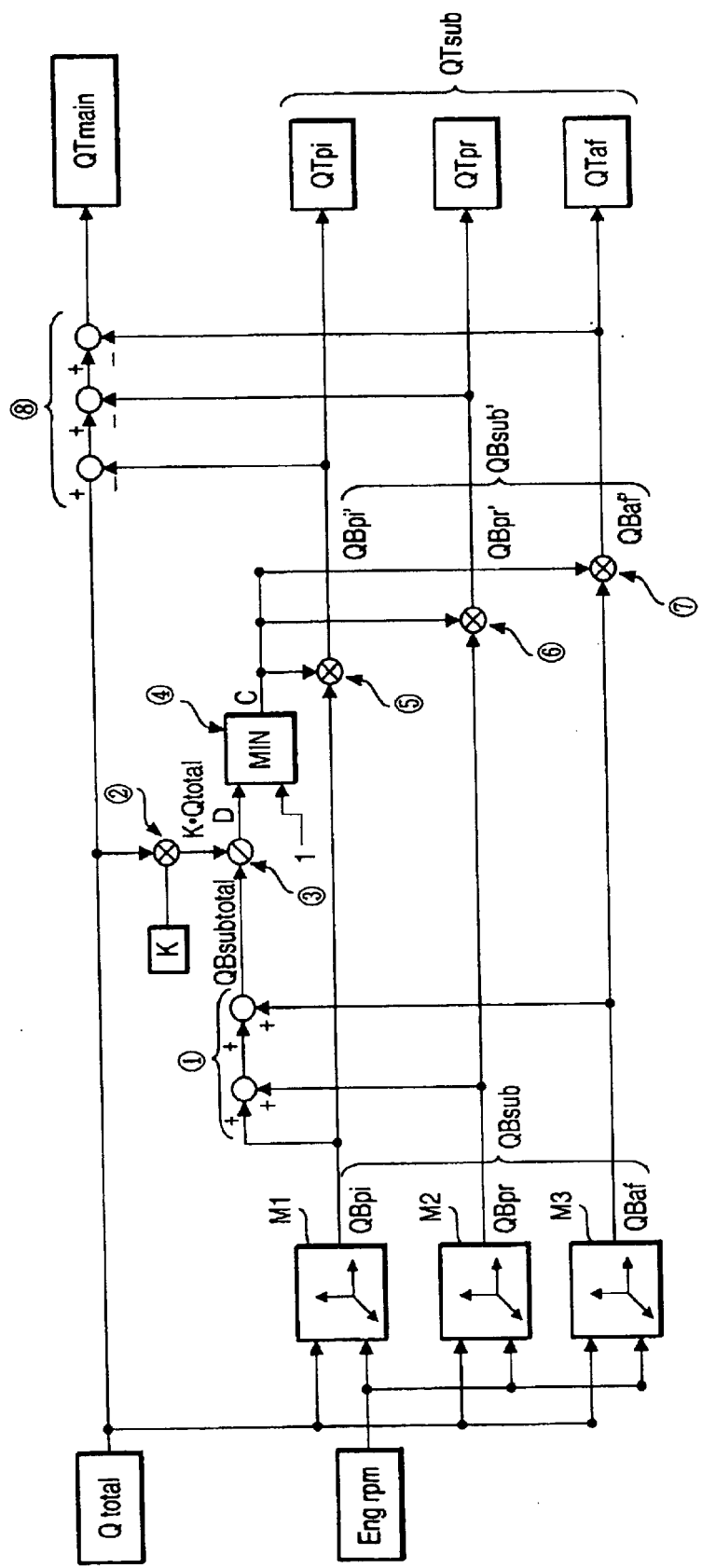
FIG. 3 is block diagram illustrating an example of the method for determining the injection quantity.

The controller 12 then computes the sum QBsubtotal (QBsubtotal=QBpi+QBpr+QBaf) by adding up all the base injection quantities for auxiliary injections QBsub (QBpi, QBpr, QBaf) determined from the maps M1 through M3 in point ① shown in FIG. 3. The base injection quantity QBsub of auxiliary injection as referred to herein is a value obtained after conducting correction based, e.g., on water temperature and intake temperature in a separate control logic.

On the other hand, the controller 12 multiplies the total injection quantity Qtotal by the coefficient K in point ② in the figure. In point ③ in the figure, a quotient D (D=K·Qtotal/QBsubtotal) is computed by dividing the value (K·Qtotal) obtained by multiplying the total injection quantity Qtotal by the coefficient K by the sum QBsubtotal, and in point ④ shown in the figure, the quotient D is compared with 1 and the smaller of them is determined as a correction coefficient C.

When the quotient D is 1 or more, it means that the aforesaid sum QBsubtotal is not more than the value obtained by multiplying the total injection quantity Qtotal by the coefficient K (QBsubtotal≦K·Qtotal). In other words, it means that even if the base injection quantity QBsub of auxiliary injections determined from the map is used directly, the fraction of the injection quantity Qtotal of the main injection in the total injection quantity is not less than the lower limit value. Therefore, in this case, 1 is selected as the correction coefficient C. Further, in points ⑤, ⑥, ⑦, the respective base injections QBsub (QBpi, QBpr, QBaf) of each auxiliary injection are multiplied by correction coefficient C. Because the correction coefficient C is equal to 1, substantially no correction is conducted, and the base injections QBsub' (QBpi', QBpr', QBaf') of each auxiliary injection after correction are equal to base injection quantities QBsub prior to correction. Further, those base injections QBsub (QBpi, QBpr, QBaf) of each auxiliary injection are determined as the target injection quantities QTsub (QTpi, QTpr, QTaf) of auxiliary injections. Furthermore, in point ⑧ shown in the figure, all the base injection quantities QBsub of each auxiliary injection are deducted from the total injection quantity Qtotal and a target injection quantity QTmain of the main injection (QTmain=Qtotal−QBsubtotal) is determined. The controller 12 outputs a drive pulse to the drive circuit of injectors 6 according to those target injection quantity QTmain of the main injection and target injection quantities QTsub of each auxiliary injection.

On the other hand, when the aforesaid quotient D is less than 1 in point ④ shown in the figure, it means that the aforesaid sum QBsubtotal is larger than the value obtained by multiplying the total injection quantity Qtotal by the coefficient K (QBsubtotal>K·Qtotal). In other words, if the base injection quantities QBsub of auxiliary injections determined from the maps are directly used, it means that the fraction of the injection quantity Qmain of the main injection in the total injection quantity Qtotal became less than the lower limit value. Furthermore, there is a possibility that the sum QBsubtotal became larger than the total injection quantity Qtotal. Therefore, in this case, the quotient D (D<1) is selected as the correction coefficient C. Then, in points ⑤, ⑥, ⑦, the base injection quantities QBsub (QBpi, QBpr, QBaf) of each auxiliary injection are multiplied by correction coefficient C and the base injection quantities QBsub of auxiliary injections are corrected. Because the correction coefficient C is less than 1, base injections QBsub' (QBpi', QBpr', QBaf') of each auxiliary injection after the correction assume values less than the base injections QBsub prior to correction. In other words, the base injection values QBsub' of each auxiliary injection are reductionally corrected by respective equal ratios. Furthermore, the sum QBsubtotal' of the base injection quantities QBsub' of auxiliary injections after the correction becomes equal to the value (K·Qtotal) obtained by multiplying the total injection quantity Qtotal by the coefficient K.

The base injection quantities QBsub' of each auxiliary injection after the correction are then determined as target injection quantities QTsub (QTpi, QTpr, QTaf) of auxiliary injections. Furthermore, in point ⑧ shown in the figure, the target injection quantity QTmain of the main injection is determined by subtracting all the base injection quantities QBsub' of auxiliary injections after the correction from the total injection quantity Qtotal (QTmain=Qtotal−QBsubtotal'). At this time, the fraction of the total injection quantity Qtotal taken by the target injection quantity QTmain of the main injection becomes a lower limit value. The controller 12 outputs a drive pulse to the drive circuit of injectors 6 according to those target injection quantity QTmain of the main injection and the target injection quantities QTsub (QTpi, QTpr, QTaf) of each auxiliary injection.

Thus, the controller 12 of the present embodiment has the functions of the first means, second means, and third means mentioned in the claims.

An example of reduction correction of the base injection quantities QBsub of auxiliary injections will be explained hereinbelow by using actual values.

Here, an assumption is made that the total injection quantity Qtotal determined from the map based on the engine revolution speed Eng rpm and accelerator opening degree is 20 $mm^3$/st, and the base injection quantities QBsub of auxiliary injections determined based on the engine revolution speed Eng rpm and the total injection quantity Qtotal are represented by a pilot injection quantity QBpi of 6 $mm^3$/st, a pre-injection quantity QBpr of 8 $mm^3$/st, and an after-injection quantity QBaf of 10 $mm^3$/st. Furthermore, the coefficient K determined based on the engine operation state is assumed to be 0.6. In other words, a case is considered in which at least 40% of the total injection quantity Qtotal is wished to be secured as an injection quantity of the main injection.

First, the sum QBsubtotal of the base injection quantities QBsub of all the auxiliary injections computed in point ① shown in FIG. 3 becomes 6+8+10=24. Then, the value K·Qtotal obtained by multiplying the total injection quantity Qtotal computed in point ② by the coefficient K becomes 20×0.6=12. Because the aforesaid sum QBsubtotal is larger than the value obtained by multiplying the total injection quantity Qtotal by the coefficient K, the quotient D computed in point ③ becomes 12/24=0.5 and assumes a value less than 1. Therefore, in point ④, the quotient D (0.5) is selected as a correction coefficient C, and in points ⑤, ⑥, and ⑦, the base injection quantity QBsub of each auxiliary injection is multiplied by the correction coefficient C.

As a result, the base pilot injection quantity after correction QBpi' becomes 6×0.5=3 $mm^3$/st, the base pre-injection quantity after correction QBpr' becomes 8×0.5=4 $mm^3$/st, and the base after-injection quantity after correction QBaf' becomes 10×0.5=5 $mm^3$/st, and they are determined as the target pilot injection quantity QTpi, target pre-injection quantity QTpr, and target after-injection quantity QTaf.

Further, in point ⑧, the target injection quantity QTmain of the main injection is computed by subtracting the sum QBsubtotal' of the base auxiliary injection quantities Qsub' after the correction from the total injection quantity Qtotal. In other words, QTmain=20−(3+4+5)=8 $mm^3$/st, and the fraction taken by the target injection quantity QTmain of the main injection in the total injection quantity Qtotal becomes 40% of the lower limit value.

Further, a method for correcting the base injection quantities QBsub of auxiliary injections is not limited to the above-described embodiment. For example, it is not necessary to conduct reduction correction of the base injection quantities QBsub of auxiliary injections at equal ratios, and a priority sequence of the auxiliary injections may be set in advance and a larger subtraction can be applied to those auxiliary injections that have a lower priority sequence. Alternatively, it is also possible to carry out no auxiliary injection with a low priority sequence.

Further, it is preferred that the auxiliary injections are not conducted when the base injection quantities QBsub' of auxiliary injections after the correction are less than the minimum fuel injection quantity of injectors 6.

What is claimed is:

1. A fuel injection control device for executing multiple injection by conducting a plurality of auxiliary injections and a main injection within one cycle, comprising:

first means for determining a total injection quantity Qtotal of fuel injected within one cycle based on parameters representing an engine operation state;

second means for determining base injection quantity QBsub of each of the plurality of auxiliary injection based on the parameters representing the engine operation state; and third means which, when a sum QBsubtotal of the base injection quantities QBsub of the plurality of auxiliary injections is not larger than a value obtained by multiplying the total injection quantity Qtotal by a coefficient K ($0<K\leq1$), computes an injection quantity QTmain of the main injection by subtracting the sum QBsubtotal from the total injection quantity Qtotal, and when the sum QBsubtotal is larger than the value obtained by multiplying the total injection quantity Qtotal by the coefficient K, computes the injection quantity QTmain of the main injection by reductionally correcting the base injection quantities QBsub of the plurality of auxiliary injections so that the sum QBsubtotal' of the base injection quantities QBsub' of auxiliary injections after the correction becomes not larger than the value obtained by multiplying the total injection quantity Qtotal by the coefficient K, and by subtracting the sum QBsubtotal' after the correction from the total injection quantity Qtotal.

2. The fuel injection control device according to claim 1, wherein the third means, when the sum QBsubtotal of base injection quantities Qsub of the auxiliary injections is larger than the value obtained by multiplying the total injection quantity Qtotal by the coefficient K, computes a correction coefficient C by dividing the value obtained by multiplying the total injection quantity Qtotal by the coefficient K by the sum QBsubtotal, multiplies each of the base injection quantities QBsub of auxiliary injections by the correction coefficient C, and reduction corrects the base injection quantities QBsub of the auxiliary injection by an equal amount.

3. The fuel injection control device according to claim 1, wherein the third means determines the coefficient K based on the parameters representing the engine operation state such as engine revolution speed and engine load.

4. The fuel injection control device according to claim 2, wherein the third means determines the coefficient K based on the parameters representing the engine operation state such as engine revolution speed and engine load.

* * * * *